US 6,734,240 B2

(12) United States Patent
Staller et al.

(10) Patent No.: US 6,734,240 B2
(45) Date of Patent: May 11, 2004

(54) USE OF PHOSPHATE GROUP-CONTAINING POLYMER DISPERSIONS AS ADHESIVES

(75) Inventors: Christelle Staller, Seltz (FR); Karl-Heinz Schumacher, Neustadt (DE); Bernhard Schlarb, Ludwigshafen (DE); Alexander Centner, Roedersheim-Gronau (DE); Oliver Hartz, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 159 days.

(21) Appl. No.: 10/036,508

(22) Filed: Jan. 7, 2002

(65) Prior Publication Data

US 2002/0161079 A1 Oct. 31, 2002

(30) Foreign Application Priority Data

Jan. 23, 2001 (DE) .......................... 101 02 961

(51) Int. Cl.⁷ ................................. C08K 5/52
(52) U.S. Cl. ..................................... 524/145
(58) Field of Search .......................... 524/145

(56) References Cited

U.S. PATENT DOCUMENTS

| 4,456,726 A | 6/1984 | Siol et al. |
| 4,645,711 A | 2/1987 | Winslow et al. |
| 5,116,676 A | 5/1992 | Winslow |
| 6,348,528 B1 * | 2/2002 | Schlarb et al. .............. 524/141 |
| 2001/0041238 A1 | 11/2001 | Staller et al. |

FOREIGN PATENT DOCUMENTS

| DE | 100 10 983 | 9/2001 |
| EP | 0 081 083 | 6/1983 |
| EP | 0 287 306 | 10/1988 |
| WO | WO 99/46337 | 9/1999 |

OTHER PUBLICATIONS

Houben–Weyl, Methoden der Organischen Chemie, vol. XIV/1, pp. 411–420, "Perlpolymerisation Mit Hilfe Von Dispergatoren", 1961.

Houben–Weyl, Methoden der Organischen Chemie, vol. 14/1, pp. 192–208, "Allgemeines Zur Polymerisation in Heterogener Phase", 1961.

* cited by examiner

Primary Examiner—Kriellion A. Sanders
(74) Attorney, Agent, or Firm—Oblon, Spivak, McClelland, Maier & Neustadt, P.C.

(57) ABSTRACT

The present invention relates to an aqueous polymer dispersion and an adhesive for self-adherent peelable films, tapes, and labels.

16 Claims, No Drawings

USE OF PHOSPHATE GROUP-CONTAINING POLYMER DISPERSIONS AS ADHESIVES

DESCRIPTION

The invention relates to the use of an aqueous polymer dispersion as an adhesive for self-adherent peelable films, tapes or labels, characterized in that the polymer dispersion contains from 0.1 to 10 parts by weight, based on 100 parts by weight of polymer, of an emulsifier A) containing a phosphate group.

Many applications call for self-adherent labels, films and tapes which can be later peeled from the substrate.

The self-adherent articles should adhere well to the substrate but on the other hand no residues should remain on the substrate when the labels, tapes or films have been peeled off. To achieve non-residue peelability, use has hitherto often been made of polymer dispersions containing crosslinking agents. However, this requires an additional mixing operation.

Unpublished DE 100109837 (O.Z. 0050/51222) discloses copolymers containing ureido groups which are suitable for peelable labels and films.

WO 99/46337 describes aqueous polymer dispersions containing a phosphate group-containing emulsifier.

The present invention relates to films tapes and labels leaving no residues when peeled from a substrate. However, the protective films tapes and labels should nevertheless stick well to the substrate. Furthermore the adhesive layer should adhere well to the self-adherent articles and should be transparent, resistant to ageing and light-resistant.

Accordingly, we have found the use defined above.

The polymer that is dispersed in the aqueous dispersion preferably consists of so-called main monomers to an extent of at least 40 wt % and more preferably to an extent of at least 60 wt % and most preferably to an extent of at least 80 wt %.

The main monomers are selected from the group comprising $C_1$–$C_{20}$ alkyl (meth)acrylates, vinyl esters of carboxylic acids containing up to 20 carbons, vinyl aromatic compounds containing up to 20 carbons, ethylenically unsaturated nitriles, vinyl halides, vinyl ethers of alcohols containing from 1 to 10 carbons, aliphatic hydrocarbons containing from 2 to 8 carbons and having 1 or 2 double bonds, or mixtures of these monomers.

The following may be mentioned by way of example: alkyl (meth)acrylates containing a $C_1$–$C_{10}$ alkyl group, such as methyl methacrylate, methyl acrylate, n-butyl acrylate, ethyl acrylate and 2-ethylhexyl acrylate.

In particular, mixtures of alkyl (meth)acrylates are suitable.

Vinyl esters of carboxylic acids containing from 1 to 20 carbons are eg vinyl laurate, vinyl stearate, vinyl propionate, vinyl esters of Versatic acid and vinyl acetate.

Suitable vinylaromatic compounds are vinyl toluene, α- and π-methylstyrenes, α-butylstyrene, 4-n-butylstyrene, 4-n-decylstyrene and preferably styrene. Examples of nitriles are acrylonitrile and methacrylonitrile.

The vinyl halides are ethylenically unsaturated compounds that are substituted by chlorine, fluorine or bromine, preferably vinyl chloride and vinylidene chloride.

Vinyl ethers which may be mentioned are eg vinyl methyl ether or vinyl isobutyl ether. Preference is given to a vinyl ether of alcohols containing from 1 to 4 carbons.

As hydrocarbons containing from 2 to 8 carbons and two olefinic double bonds there may be mentioned butadiene, isoprene and chloroprene, and those containing one double bond are eg ethylene and propylene.

The main monomers are preferably $C_1$–$C_{10}$ alkyl (meth) acrylates, particularly $C_1$–$C_8$ alkyl (meth)acrylates and vinyl aromatic compounds, particularly styrene, and mixtures thereof.

Very special preference is given to methyl acrylate, methyl methacrylate, ethyl acrylate, n-butyl acrylate, n-hexyl acrylate, octyl acrylate and 2-ethylhexyl acrylate, styrene and mixtures of these monomers.

Besides the main monomers the radical-polymerized polymers can contain other monomers, eg monomers containing carboxylic acid, sulfonic acid or phosphonic acid groups. Preference is given to carboxylic acid groups. As examples thereof there may be mentioned acrylic acid, methacrylic acid, itaconic acid, maleic acid or fumaric acid.

Other monomers are eg monomers containing hydroxyl groups, particularly $C_1$–$C_{10}$ hydroxyalkyl (meth)acrylates, and (meth)acrylamide.

As examples of further monomers there may be mentioned phenyloxyethyl glycol mono(meth)acrylate, glycidyl acrylate, glycidyl methacrylate and amino (meth)acrylates such as 2-aminoethyl (meth)acrylate.

Other possible monomers include crosslinking monomers; however, the presence of crosslinking monomers or other crosslinking agents is not absolutely necessary for the purposes of the present invention.

Synthesis of the polymers is carried out in a preferred embodiment by emulsion polymerization, and they are consequently emulsion polymers.

The glass transition temperature of the polymer or emulsion polymer is preferably from –60° to +20 ° C. and more preferably from –50 ° to 0° C. and most preferably from –50° to –10° C.

The glass transition temperature can be determined by conventional methods such as differential thermal analysis or differential Scanning Calorimetry (cf eg ASTM 3418/82, "midpoint temperature").

The aqueous polymer dispersion contains from 0.1 to 10 parts by weight and preferably from 0.1 to 5 parts by weight and more preferably from 0.2 to 3 parts by weight of an emulsifier A) contaning at least one phosphate group.

The emulsifier also comprises, preferably to an extent of at least 50 wt %, alkylene oxide groups, particularly ethylenoxide groups, propylene oxide groups or mixtures thereof.

The emulsifier is preferably a compound comprising, to an extent of at least 70 wt %, ethylene oxide and/or propylene oxide groups.

Particular preference is given to an embodiment in which the emulsifier contains both ethylenoxide groups and propylene oxide groups.

The proportion of ethylenoxide groups is at least 10 wt % and preferably at least 40 wt %, based on the molecular weight of the emulsifier.

The proportion of propylene oxide groups is at least 10 wt %, preferably at least 20 wt %, based on the molecular weight of the emulsifier.

The molecular weight of the emulsifier is preferably from 400 to 2000 g/mol and more preferably from 600 to 1600 g/mol.

It is preferably an emulsifier of the formula

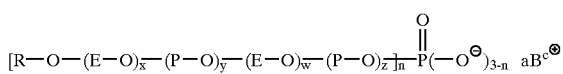

in which the variables have the following meanings:

E: $CH_2\!-\!CH_2$

P:

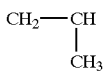

| | |
|---|---|
| R: | $C_1$-$C_{18}$ alkyl |
| x, y, w, z: | each denote an integer from 0 to 30, |
| x + w: | at least 1 |
| y + z: | at least 1 |
| n: | 1 or 2 |
| B: | a monovalent or divalent cation |
| a, c: | each denote 1 or 2, a*c being equal to 3-n |

Preferably R stands for $C_{10}$–$C_{16}$ alkyl. The term x+w is preferably equal to from 6 to 20 and more preferably from 10 to 14. The term y+z is preferably equal to from 2 to 10 and more preferably from 3 to 7. Preferably both w and z are equal to 0.

B is preferably a monovalent cation, particularly of Na, K, $NH_3$ or H, correspondingly c is equal to 1 and a is equal to 1 or 2.

Compounds of this kind are available, eg, under the Trade Name Lutensit® (BASF).

The emulsifier is preferably used when the emulsion polymerization of the monomers takes place. The monomers are dispersed in aqueous phase with the aid of the emulsifier and then polymerized.

In addition to emulsifier A), other emulsifiers or other surface-active compounds can be used.

However, the additional use of other emulsifiers or surface-active compounds is not absolutely necessary.

A detailed description of suitable protective colloids is given in Houben-Weyl, Methoden der organischen Chemie, Vol. XIV/1, "Makromolekulare Stoffe", Georg-Thieme-Verlag, Stuttgart, 1961, pp 411 to 420. Suitable emulsifiers are anionic, cationic and non-ionic emulsifiers. Preferably, supplementary surfactants used are exclusively emulsifiers, whose molecular weight, unlike the protective colloids, is usually below 2000 g/mol. Of course, when use is made of mixtures of surfactants, the constituents have to be compatible with each other, which can be checked if necessary by a few preliminary tests. Preferably, anionic and non-ionic emulsifiers are used as surfactants. Commonly used supplementary emulsifiers are for example ethoxylated fatty alcohols (comprising $C_8$–$C_{36}$ alkyl; degree of ethoxylation: 3 to 50), ethoxylated mono-, di- and tri-($C_4$–$C_9$ alkyl)phenols (degree of ethoxylation: 3 to 50), alkali-metal salts of dialkyl esters of sulfosuccinic acid and also alkali-metal and ammonium salts of ($C_8$–$C_{12}$ alkyl) sulfates, of ethoxylated $C_{12}$–$C_{18}$ alkanols (degree of ethoxylation: 4 to 30), of ethoxylated ($C_4$–$C_9$ alkyl) phenols (degree of ethoxylation: 3 to 50), of ($C_{12}$–$C_{18}$ alkyl)sulfonic acids and of ($C_9$–$C_{18}$ alkyl)arylsulfonic acids.

Other suitable emulsifiers are compounds of the general formula II

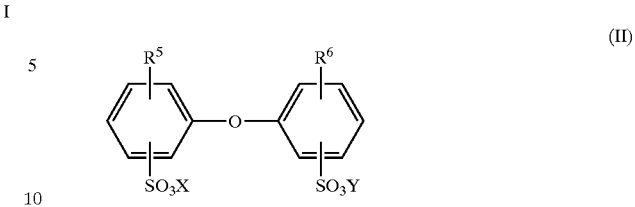

in which $R^5$ and $R^6$ denote hydrogen or $C_4$–$C_{14}$ alkyl and are not both hydrogen at the same time, and X and Y can be alkali-metal ions and/or ammonium ions. Preferably, $R^5$, $R^6$ denote linear or branched alkyl groups containing from 6 to 18 carbons or hydrogen and particularly containing 6, 12 and 16 carbons, whilst $R^5$ and $R^6$ are not both hydrogen. X and Y are preferably sodium, potassium or ammonium ions, sodium being particularly preferred. Compounds II in which X and Y denote sodium, $R^5$ denotes a branched alkyl group containing 12 carbons and $R^6$ is hydrogen or $R^5$ are particularly advantageous. Frequently industrial mixtures are used having a content of from 50 to 90 wt % of the monoalkylated product, for example Dowfax® 2A1 (trademark of Dow Chemical Company).

Suitable emulsifiers are also given in Houben-Weyl, Methoden der organischen Chemie, Vol. 14/1, "Makromolekulare Stoffe", Georg Thieme Verlag, Stuttgart, 1961, pages 192 to 208.

Trade Names of emulsifiers are eg Dowfax® 2A1, Emulan® NP 50, Dextrol® OC 50, Emulsifier 825, Emulsifier 825 S, Emulan® OG, Texapon® NSO, Nekanil® 904 S, Lumiten® I-RA, Lumiten E 3065, Disponil FES 77, Lutensol AT 18, Steinapol VSL and Emulphor NPS 25.

The surfactant is usually employed in amounts of from 0.1 to 10 wt %, based on the monomers to be polymerized.

Water-soluble initiators for emulsion polymerization are eg ammonium and alkali-metal salts of peroxydisulfuric acid, eg sodium peroxodisulfate, hydrogen peroxide or organic peroxides, eg tert-butyl hydroperoxide.

So-called redox initiator systems are also suitable.

Redox initiator systems are made up of at least one, usually inorganic, reducing agent and one inorganic or organic oxidizing agent.

The oxidizing component is for example one of the aforementioned initiators for the emulsion polymerization.

The reducing components are eg alkali-metal salts of sulfurous acid, such as sodium sulfite, sodium hydrogensulfite, alkali-metal salts of pyrosulfurous acid such as sodium disulfite, bisulfite addition compounds of aliphatic aldehydes and ketones, such as acetone bisulfite or reducing agents such as hydroxymethanesulfinic acid and the salts thereof, or ascorbic acid. The redox initiator systems can be used together with soluble metal compounds whose metallic component can exist in more than one valence state.

Common redox initiator systems are eg ascorbic acid/iron (II) sulfate/sodium peroxodisulfate, tert-butylhydroperoxide/sodium disulfite, tert-butyl hydroperoxide/sodium hydroxymethanesulfinic acid. The individual components, eg the reducing component, may be mixtures, eg a mixture of the sodium salt of hydroxymethanesulfinic acid and sodium disulfite.

The said compounds are mostly used in the form of aqueous solutions, the lower concentration limit being determined by the amount of water acceptable in the dispersion and the upper concentration limit by the solubility of the respective compound in water. Generally, the concentration is from 0.1 to 30 wt %, preferably from 0.5 to 20 wt % and more preferably from 1.0 to 10 wt %, based on the solution.

The amount of initiators used is generally from 0.1 to 10 wt % and preferably from 0.5 to 5 wt %, based on the monomers to be polymerized. Alternatively, a number of different initiators can be used for the emulsion polymerization.

During polymerization, regulators can be used, eg in amounts of from 0 to 0.8 parts by weight, based on 100 parts by weight of the monomers to be polymerized, by means of which the molar mass is reduced. Suitable compounds are for example those having a thiol group such as tert-butyl mercaptan, thioglycolic acid ethyl acrylate, mercaptoethynol, mercaptopropyl trimethoxysilane or tert-dodecyl mercaptan.

The emulsion polymerization is usually carried out at from 30° to 130° C. and preferably from 50° to 90° C. The polymerization medium can consist either of water only or of mixtures of water and water-miscible liquids such as methanol. Preferably, only water is used. The emulsion polymerization can be carried out either as a batch process or in the form of an inflow process, including stepwise or gradient processing. Preference is given to an inflow process in which a portion of the polymerization recipe is placed in the reactor, heated to the polymerization temperature and incipiently polymerized, after which the rest of the polymerization recipe is fed to the polymerization zone, usually via a number of discrete feed streams, of which one or more contains the monomers in a pure or emulsified form, continuously, stepwise or with superimposed concentration gradient, whilst maintaining polymerization. The particle size achieved during polymerization may be more finely adjusted by the use of a polymer seed in the initial batch.

The manner in which initiator is fed to the polymerization vessel during the course of free-radical aqueous emulsion polymerization is known to the person possessing average skill in the art. It can either be placed as entire batch in the polymerization vessel, or it can be fed in during the free-radical aqueous emulsion polymerization at the rate at which it is consumed, continuously or stepwise. Specifically, this depends on the chemical nature of the initiator system and on the polymerization temperature. Preferably, a portion is used for the initial batch while the rest is fed to the polymerization zone at the rate at which it is consumed.

In order to remove residual monomers, initiator is usually also added on completion of the actual emulsion polymerization, ie after a conversion of the monomers of at least 95% has been achieved.

The individual components can be fed to the reactor during the inflow process downwardly, from the side, or upwardly through the base of the reactor.

The emulsion polymerization produces aqueous dispersions of the polymer usually having a solids content of from 15 to 75 wt %, preferably from 40 to 75 wt %.

In order to attain a high space-time yield of the reactor, dispersions having maximum solids contents are preferred. In order to achieve solids contents >60 wt %, the particle size should be bimodal or polymodal, as otherwise the viscosity is too high and the dispersion is no longer easy to handle. The production of a new particle generation can be achieved for example by the addition of seed (EP 81,083), by the addition of an excess amount of emulsifying agent or by the addition of mini-emulsions. Another advantage gained by low viscosity and high solids is an improvement in the coating properties at high solids contents. The production of one or more new particle generations can take place at any time. It is governed by the particle-size distribution required to give a low viscosity.

The polymer thus prepared is preferably used in the form of an aqueous dispersion thereof.

The polymer dispersion is used as adhesive for peelable films, tapes or labels.

The adhesive may comprise only the aqueous dispersion of the polymer.

The adhesive may, however, contain further additives, eg wetting agents, thickeners, stabilizing agents, light-stabilizing agents and biocides.

The film of the invention is preferably a thermoplastic film coated on one side with the adhesive. It may be any suitable polymer film, such as a film of a polyolefin, eg polyethylene, polypropylene and polyolefin copolymer or a film of polyester or polyacetate.

Alternatrively, the film may be a compound film composed of various polymer films.

If desired, an adhesion promoter can be applied to the surface of the film in order to improve the adherence of the adhesive layer.

The tapes can be tapes composed of the above substances and coated on one or both sides.

The labels of the invention can be labels of paper or preferably of thermoplastic film. Suitable thermoplastic films are the above-mentioned polymer films. The labels are coated on one side with adhesive.

The adhesive can be applied to the films, tapes or labels by conventional methods such as knife coating and brush coating.

The rate of application is preferably from 0.1 to 20 g and more preferably from 2 to 15 g of copolymer per m$^2$.

Application is generally followed by a drying step for the removal of water.

The degree of adhesion of the adhesive layer to the films, tapes or labels is very good.

The film is suitable for protection purposes, particularly during the transfer and storage of objects (protective film).

The objects to be protected may be eg objects of metal, wood, glass or plastics material.

As examples thereof there may be mentioned motor vehicle bodies or parts of motor vehicle bodies, varnished surfaces and transparent surfaces.

The labels are particularly suitable for the surfaces of, say, packages, books etc.

The films, tapes and labels can be manually peeled from the objects without a residue of adhesive remaining on the object. The adhesion of the films, tapes and labels to the objects is good; nevertheless they can be readily peeled off. This good repeelability keeps for a long period of time.

In particular, the films, tapes and labels of the invention are also suitable for substrates of steel. The phosphorus-containing emulsifier contributes at the same time to corrosion control.

EXAMPLES

I. Preparation of Polymer Dispersions

1. Preparation of the Dispersion Containing Emulsifier A

|  | Initial batch (g) | Monomer emulsion (g) | Initiator (g) | Post-catalysis (g) |
|---|---|---|---|---|
| Water | 260 | 202 | | |
| Fine seed | 3.25 | | | |
| (33% strength in water) | | | | |
| Emulsifier A solution | | 35.75 | | |
| 2-EHA | | 214.5 | | |
| nBA | | 450.45 | | |
| MMA | | 21.45 | | |
| M-Amol | | 95.33 | | |
| AA | | 14.30 | | |

-continued

|  | Initial batch (g) | Monomer emulsion (g) | Initiator (g) | Post-catalysis (g) |
|---|---|---|---|---|
| NaPS 7% strength solution in water |  |  | 51.07 |  |
| t-BHP 10% strength solution in water |  |  |  | 21.4 |
| Acetone |  |  |  | 1.36 |
| Sodium disulfite |  |  |  | 2.15 |
| Lumiten ® IDS 3525 |  |  |  | 6.16 |

Emulsifier A solution: 20 wt % strength solution of an ethoylated and propoxylated phosphate of formula I, available as Lutensit ® A-EP sold by BASF.
Lumiten ® IDS 3525: 58 wt % strength aqueous sollution of the sodium salt of a sulfosuccinate in water/isotridecanol ethoxylate.
MMA: methyl methacrylate
2-EHA: 2 ethylhexyl acrylate
n-Ba: n-butyl acrylate
M-Amol: N-methylol acrylamide
AA: acrylic acid
NaPS: sodium peroxosulfate
t-BHP: tert-butyl hydroperoxide Procedure The initial batch was placed in a 2 liter flask equipped with a reflux condenser, nitrogen inlet and metal agitator. The temperature was raised to 90° C. whilst purging with nitrogen. 20% of the initiator solution was added over a period of 2 minutes. After 5 minutes, the monomer emulsion was added over a period of 2.5 hours. At the same time the remaining initiator solution was added over a period of 2.75 hours. The mixture was then cooled to 80° C. and the post-catalysis solution added in order to lower the residual monomer content. The pH was then set to 7 with ammoniacal liquor. 0.5% of Lumiten IDS 3252 were finally mixed into the dispersion. Lumiten IDS 3525 is used to improve the wetting power of the dispersion.

2. Dispersion Containing Disponil FES 77 (for Comparison)

Example 1 was repeated except that the 1% of emulsifier A was replaced by 1% of Disponil® FES 77 [30 wt % strength solution of the sodium salt of a mixture of sulfuric acid half-esters of $C_{10}$–$C_{16}$ ethoxylates (average degree of ethoxylation 30) in water], sold by Gognis.

II. Preparation of the Protective Films and Application-technological Tests

The dispersion was knife-coated onto a polyethylene film (corona pretreated) at a rate of from 5 to 6 $g/m^2$ and dried at 90° C. for three minutes.

Test for Residue-free Peeling

This test consists in the evaluation of the appearance of the surface to be protected following peeling of the protective film. The surface to which the film is stuck is stored at 50° C. and 80% relative humidity for periods of one and four weeks respectively. Then the films are manually removed slowly and, in a second test, rapidly and the residue on the surface is assessed visually. Ideally, the surface is free from adhesive residues.

The following scale is used for the evaluation:
1. substrate surface unchanged
2. impression of the film discernable as a shadow
3. some residue of adhesive on the surface
4. portions of the adhesive layer transferred to the surface
5. adhesive layer completely transferred to the surface
6. cohesion failure Peeling is Judged According to the Following Scale:
A: very little adhesion
B: easy to peel
C: difficult to peel Tests were carried out on steel, polycarbonate and Plexiglass.

|  |  | Plexiglass | | Polycarbonate | | steel | |
|---|---|---|---|---|---|---|---|
| Dispersion | Removal | 1 week | 4 weeks | 1 week | 4 weeks | 1 week | 4 weeks |
| Dispersion containing 1% of emulsifier A | slow | C1 | C1 | C1 | C1 | B1 | C2 |
|  | fast | C1 | C1 | C1 | C1 | B1 | C2 |
| Dispersion containing 1% of Disponil FES 77 | slow | C1 | C1 | C1 | C1 | C2 | C2 |
|  | fast | C1 | C1 | C1 | C1 | C6 | C2 |
| Acronal ® A 213 S | slow | C1 | C1 | C1 | C1 | C6 | C6 |
|  | fast | C1 | C1 | C1 | C1 | C6 | C6 |

Acronal ® A 213 S is a commercial dispersion-based crude adhesive which is sold by BASF for applications involving protective films.

Following a storage period of one week, the dispersion containing 1% of emulsifier A is easier to peel from steel than is Acronal A 213 S or the dispersion containing 1% of Disponil FES.

Quick-stick test and peel strength, tested on polyethylene film:

The dispersions were knife-coated to 25 mm wide pieces of polyethylene film at a rate of 20 $g/m^2$ and dried at 90° C. over a period of 3 minutes.

The resulting protective films were stuck to a steel plate and the quick-stick and peel strength tested at 23° C. and 50% relative humidity.

After storage for 24 h, the peel strength was determined in a tension tester having a take-up speed of 300 mm/min.

Quick-stick Test

To determine the quick-stick strength a 17.5 cm long and 2.5 cm wide test strip was clamped at both ends in the jaws of a tensile testing machine to form a loop, which was then brought into contact with a chromium-plated steel surface at the rate of 30 cm/min (lowering of the loop onto the chromium-plated sheet steel). After all-over contact had been achieved, the loop was immediately removed and the maximum force in N/2.5 cm occurring during this operation was determined as a measure of the quick-stick strength (loop strength, tack).

|  | Quick-stick test | Peel strength in N/25 mm | |
|---|---|---|---|
| Dispersion |  | immediately | 24 hours later |
| Dispersion containing 1% of emulsifier A | 2.7 | 2.4 | 2.7 |
| Dispersion containing 1% of Disponil FES 77 | 3.8 | 1.8 | 4.7 |
| Acronal ® A 213 S | 2.1 | 1.9 | 3.8 |

The dispersion containing emulsifier A) shows consistently good peel strengths. There is no increase to excessively high values with time.

What is claimed is:

1. A method of using an aqueous polymer dispersion as adhesive for a self-adherent peelable film, tape or label, comprising:

treating a film, tape or label with a polymer dispersion containing from 0.1 to 10 parts by weight, of an emulsifier A) containing a phosphate group, based on 100 parts by weight of polymer, thereby obtaining said self-adherent peelable film, tape or label;

wherein said emulsifier A) is represented by the formula

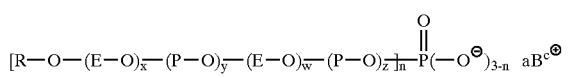

I wherein

P is

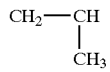

R is $C_1$–$C_{18}$ alkyl, x,y,w,z, each denote an integer from 0 to 30, x+w is at least 1, y+z is at least 1, n is 1 or 2, B is a monovalent or divalent cation, a,c, each denote 1 or 2, a*c being equal to 3–n.

2. A method as defined in claim 1, wherein the emulsifier comprises alkoxyl groups to an extent of at least 50 wt %.

3. A method as defined in claim 1, wherein the emulsifier has a molecular weight of from 400 to 2000 g/mol.

4. A method as defined in claim 1, wherein the polymer dispersed in the polymer dispersion comprises at least 40 wt %,—of so-called main monomers selected from the group consisting of $C_1$–$C_{20}$ alkyl (meth)acrylates, vinyl esters of carboxylic acids containing up to 20 carbons, vinyl aromatic compounds containing up to 20 carbons, ethylenically unsaturated nitriles, vinyl halides, vinyl ethers of alcohols containing from 1 to 10 carbons, aliphatic hydrocarbons containing from 2 to 8 C atoms and one or two double bonds, and mixtures thereof.

5. A peelable, self-adherent film, tape or label obtained by a method as defined in claim 1.

6. A substrate provided with a peelable film, tape or label according to claim 5.

7. The method according to claim 1, wherein said self-adherent film, tape or label leaves no residue when peeled from a substrate.

8. The method according to claim 1, wherein said polymer is an emulsion polymer.

9. The method according to claim 1, wherein said polymer has a glass transition temperature of from –60° C. to +20° C.

10. The method according to claim 1, wherein a proportion of said ethylene oxide groups is at least 10 wt %, based on the molecular weight of said emulsifier.

11. The method according to claim 1, wherein a proportion of said propylene oxide groups is at least 10 wt %, based on the molecular weight of said emulsifier.

12. The method according to claim 1, wherein said polymer dispersion further comprises an additional emulsifier different from the emulsifier A).

13. The method according to claim 1, wherein said film is a thermoplastic film.

14. The method according to claim 1, wherein said polymer dispersion is applied to said film, tape or label at a rate of from 0.1 to 20 g of copolymer per $m^2$.

15. The method according to claim 1, further comprising drying said self-adherent peelable film, tape or label.

16. The peelable, self-adherent film, tape or label according to claim 5 which leaves no residue when peeled from a substrate.

* * * * *